United States Patent [19]

Roth et al.

[11] 4,213,449
[45] Jul. 22, 1980

[54] SOLAR COLLECTOR

[75] Inventors: Manfred Roth, Dautphetal-Mornshausen; Juergen Dreier, Dautphetal, both of Fed. Rep. of Germany

[73] Assignee: Roth Werke GmbH, Dautphetal, Fed. Rep. of Germany

[21] Appl. No.: 889,032

[22] Filed: Mar. 22, 1978

[30] Foreign Application Priority Data

Mar. 22, 1977 [DE] Fed. Rep. of Germany ....... 2712387

[51] Int. Cl.² .............................................. F24J 3/02
[52] U.S. Cl. .................................. 126/447; 126/450
[58] Field of Search ............. 126/270, 271, 444, 445, 126/450, 447; 165/170; 425/522

[56] References Cited

U.S. PATENT DOCUMENTS

| 2,810,160 | 10/1957 | Bottleman | 425/522 X |
| 3,608,020 | 9/1971 | Langecker | 425/522 X |
| 4,103,675 | 8/1978 | Bar-On et al. | 126/271 |
| 4,141,341 | 2/1979 | Eby | 126/271 |

FOREIGN PATENT DOCUMENTS

| 2639354 | 3/1978 | Fed. Rep. of Germany | 126/271 |
| 2315671 | 2/1977 | France | 126/270 |
| 2355256 | 2/1978 | France | 126/271 |

*Primary Examiner*—James C. Yeung
*Assistant Examiner*—Larry Jones
*Attorney, Agent, or Firm*—Blanchard, Flynn, Thiel, Boutell & Tanis

[57] ABSTRACT

A solar collector having a blow-molded frame and an integral absorber plate. The frame is larger in thickness than is the thickness of the absorber plate portion. The absorber plate portion of the blow-molded part has a channel system molded therein for conveying a liquid therethrough. The blow-molded part has rigidifying sections therein to enhance the stability of the solar collector.

10 Claims, 2 Drawing Figures

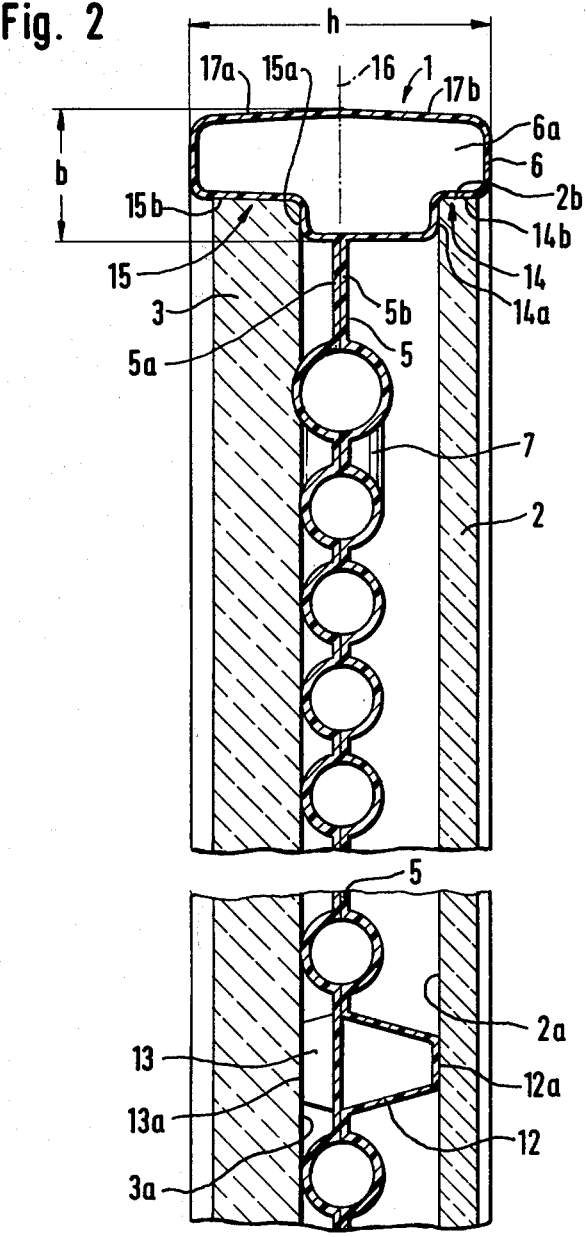

SOLAR COLLECTOR

FIELD OF THE INVENTION

The invention relates to a solar collector for collecting the radiant heat energy of the sun and for transmitting this heat to a liquid heat carrier, in particular water, comprising a pipeline system, which has at least one supply port and one discharge port, for conducting the heat carrier therethrough and preferably a glazing for example of glass, which permits heat radiation to pass therethrough and the pipeline system is part of a plate-like blow-molded absorber plate made of plastic, in which adjacent pipes are separated from one another by thermoplastically welded mash seams.

BACKGROUND OF THE INVENTION

Usage of solar collectors is becoming more and more widespread in view of the energy problems which are slowly becoming known. Solar collectors are particularly suited for the house technique for heating up of water to be used and for heating up of water for warm-water heating systems. However, the thermal yield, in relationship to the unit area of a solar collector, is not very great, in particular in regions in which there is not much sunshine. However, particularly in these moderate and colder regions much heat energy is used up. In order to replace an amount of the energy consumption, which amount is worth mentioning, with solar energy, solar collectors must have relatively large surface areas, for example several square meters for a one-family house. The building costs of heat-producing systems with solar collectors are considerable. Even though operating expenses are hardly created, the profitableness of such systems is still low because of the high capital investment. For a better profitableness, it is important to manufacture solar collectors as inexpensively as possible.

Various forms of solar collectors are known, for example those which have a dark-colored pipeline system, through which a liquid is moved. The liquid is heated up by the radiant heat energy of the sun and a reflection is substantially avoided by the dark coloring. The mentioned glazing prevents the heat which is absorbed by the collector from being radiated back.

A pipeline system can be manufactured particularly inexpensively with the aid of a blow molded absorber plate. The manufacture of a pipeline system from a blow-molded part is known from German OS No. 24 44 706 for a flat-heating element and can in principle also be utilized in a solar collector.

To achieve a further reduction in price during the manufacture of solar collectors, the basic purpose of the invention is to design a solar collector, in which the pipeline system is formed by a blow-molded absorber plate so that aside from the blow-molded absorber plate, the glazing and possibly heat-insulation material, no further parts are needed for the actual solar collector.

This purpose is attained according to the invention in such a manner that a hollow frame which is made of one piece with the blow-molded absorber plate is formed on the edge of the plate-shaped blow-molded absorber plate, which frame has a closed cross section.

Such a collector is extremely inexpensive, because the support construction, in which the pipeline system is arranged, consists of one piece with this pipeline system and is manufactured during the same operation. It is only still possible to mount on the blow-molded absorber plate a glazing and possibly on the back side thereof heat insulation material. Further operations are not needed. Because of the inexpensive manufacturing possibility, it is possible to provide also large surface areas at an affordable price. With the aid of the invention because of a strong reduction of the building costs, the feasability of heat-producing systems utilizing solar collectors is improved considerably. The hollow frame which is formed on the edge of the blow-molded absorber plate has a sufficient stability to hold a relatively large collector surface, for example a collector surface of approximately 1 $m^2$, reliably in its mold.

Grooves are preferably provided in the frame. As a result, the glazing plate and/or an insulation layer can be mounted and held comfortably in their correct position, without requiring special aligning operations. The glazing which is permeable for the heat radiation is spaced as a rule a certain distance from the pipes of the pipeline system to define an air space therebetween, for which reason a fluted mortise has a suitable position relative to the pipes. The insulation layer, however, can rest directly on the pipes or it may have also a certain spacing therefrom. Fluted mortises are not absolutely necessary, because a glazing or an insulation layer, for example could rest on the upper side or the bottom side of the frame.

The arrangement of support projections has the advantage that the solar collector has as a whole a greater rigidity. Also this prevents large-surface glazings from sagging in the midsection. The arrangement of the support projections will be chosen in accordance with the respective size, form and remaining structure of the collector. The collector may have any desired basic forms. In most cases one will choose a basic rectangular form. However, the invention is not limited to this. To adjust to special surface relationships, it is also possible for other forms to be advantageous.

Fastening holes are mounted preferably on the corners of the frame. However, this is also not absolutely necessary. It would also be possible to hold a collector for example also with clamps or other fastening elements, which do not extend through the blow-molded absorber plate, but only grip around same.

The pipeline system may be designed differently. For example a zigzag channel 7 is preferable.

A particularly preferable manufacture of a solar collector can be achieved, as stated above, by the blow-molding process. The communication between the cavities during the manufacturing process has the advantage that blown air needs to be supplied at only one single point. However, it is also easily possible to provide several supply points. The cavities then do not need to communicate with one another, if to every connected cavity an air supply is connected.

The form of the frame results in a particularly good rigid structure crosswise of the frame plane. Since solar collectors are generally arranged lying inclined to the vertical, for example on a roof surface, rigidity in this direction is particularly advantageous. Also a thin frame takes up little surface so that the surface which is utilized for the production of heat is not reduced too much by the frame.

The inventive solar collector has also the advantage that it is particularly lightweight. This again has an effect on the entire building costs of a heat-producing system because the solar collector applies only a small load to a support structure, for example the roof construction of a house, and this roof construction can be constructed correspondingly with a smaller load factor.

As a material, plastics of any kind which can be worked in the blow-molding process can be used if they are sufficiently resistant to the deteriorating effects of the sun's radiation. Black-colored polypropylene is well suited.

BRIEF DESCRIPTION OF THE DRAWINGS

One exemplary embodiment of the invention is illustrated in the drawings, in which:

FIG. 2 is a partial cross-sectional view taken along the line II—II of FIG. 1 in an enlarged scale compared with FIG. 1.

DETAILED DESCRIPTION

Figure 1:
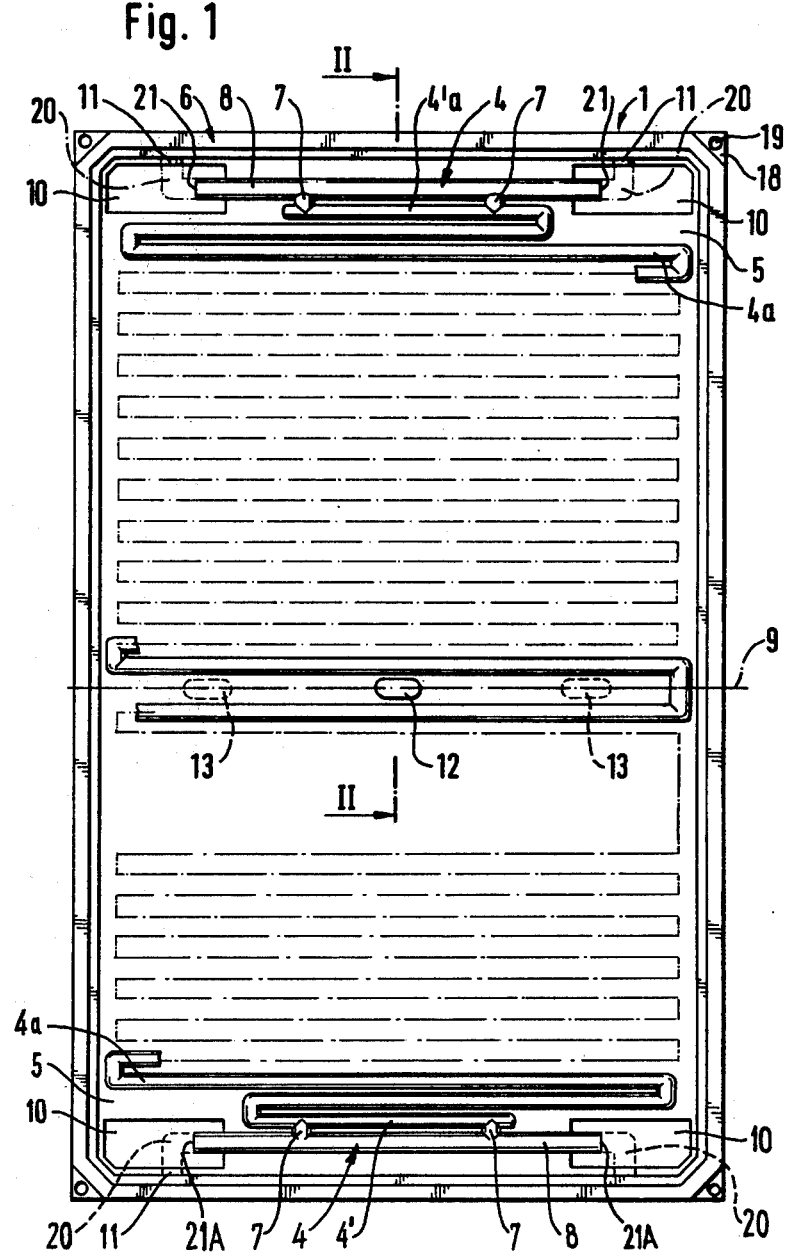
FIG. 1 is a top view of an inventive solar collector.

As can be seen from FIG. 2, the solar collector consists of a blow-molded absorber plate which is identified as a whole by the reference numeral 1, a glazing 2 and an insulation layer 3. The collector has as a whole a flat rectangular shape (see FIG. 1). In the present relationship of width and length to thickness, one can speak of a platelike part.

The blow-molded absorber plate 1 forms simultaneously a pipe system which is identified as a whole by the reference numeral 4 and which is constructed in one piece with a plate portion 5 and a hollow frame portion which as a whole is identified by the reference numeral 6.

The pipe system has a long zigzag channel 4a extending back and forth across the width of the collector along the length thereof. Long sections of the channel 4a extend parallel to the short side of the rectangular collector, while short channel sections, which connect the long sections, extend parallel to the long sides thereof. An end section 4'a of the channel 4a is connected to a collecting pipe 8 through connections 7 extending perpendicular to the section 4'a and pipe 8. The entire solar collector is symmetrical with respect to the dash-dotted line 9 extending midway along the length and parallel to the short sides so that a collecting pipe which corresponds with the collecting pipe 8 is provided also at the other end of the collector.

The collecting pipe 8 terminates at its two ends in openings 10 in the plate 5. Sockets 11 extend from said openings 10 and terminate in the cavity of the frame 6. The formation of these sockets will be discussed with reference to the description of the manufacturing process.

Three support projections 12 and 13 are provided in the longitudinal center of the solar collector, which center is defined by the dash-dotted line 9. As can be seen from FIG. 2, the support projection 12 extends to the underside 2a of the glazing 2, while the support projections 13 extend to the inner surface 3a of the insulation layer 3. In order to make room for the support projections 12 and 13, two adjacent sections of the channel 4a are arranged in the center of the collector at a slightly greater distance than in the remaining area of the collector.

The cross section of the frame can be taken from FIG. 2. The height or thickness h of the frame is greater than its width b. This results in a good rigid structure, particularly transversely to the general plane of the solar collector. Fluted mortises 14 and 15 exist along the inside of the frame. The fluted mortise has a contact surface 14a for the edge zone of the underside 2a of the glazing 2 and a peripheral surface 14b, which centers the glazing 2 on its edge 2b. The glazing can be secured to the frame for example by gluing or cover strips.

The fluted mortise 15 has suitable surfaces 15a and 15b, which has in cooperation with the insulation plate 3 the same purposes as the corresponding surfaces 14a and 14b of the fluted mortise 14.

Starting out from the center plane of the collector, which plane is indicated by the dash-dotted line 16 (FIG. 2), the sections 17a, 17b and the surfaces 14b and 15b converge outwardly in order to comfortably permit the opening of the blow-molded absorber plate.

A lug 18 is provided on each corner of the frame and has a fastening hole 19 therein for receiving a fastening element, for example a screw. The lug 18 has no cavity and is manufactured of two layers of material which are pressed onto one another and are connected by mash welding, just as in the case with the plate 5. The lugs 18 lie in the same plane as the plate 5.

The blow-molded absorber plate is manufactured as follows:

When the mold is open, a tube of plastic is extruded into the mold, as this is common in a blow-mold process, which tube is made preferably of a black-colored polypropylene. After the extrusion of the tube, the mold is closed when the tube is still in a plastic state, by squeezing the tube off at the top and bottom. The joint line of the mold which is not illustrated in the drawings is in the plane which is indicated by the dash-dotted line 16.

After the mold is closed, pressurized air is introduced, for example at a point in the outer frame 6. Due to the pressurized air, the still flexible and formable and weldable skin of the extruded tube is pressed against the walls of the mold. Where there are no cavities in the mold, two material layers, for example the material layers 5a and 5b, are welded together. Where cavities exist, a welding does not take place, namely the mold cavities are lined by the material of the extruded tube. While two material layers are welded together where there are no cavities, only one material layer exists where cavities exist.

In the illustrated exemplary embodiment, all cavities communicate with one another during the manufacture thereof. During the blowing operation, the collecting pipes 8 are connected to the cavity 6a of the frame 6 through pipe sections 20 which are illustrated by dash-dotted lines. Therefore, one single connection point for the blown air is sufficient. After the plastic has remained for a certain period of time in the mold, it becomes cooled and rigid enough so that the absorber plate is inherently stable and can be removed from the mold. Windows 10 are now punched out at every corner and the dash-dotted pipe sections 20 are cut out. Only the already described sockets 11 remain. As a result, the cavity of the pipe system 4 is separated from the cavity 6a of the frame so that a connection to the pipe system is now possible. The ports 21 which are shown in FIG. 1 are the supply ports. Discharge ports 21A are provided at the lower end.

After the blow-molded absorber plate is finished so far, the insulation plate 3 and the glazing plate 2 can be installed. They can be easily installed because they are centered in the mortises 14 and 15. The support projection 12 extends upwardly so far above the plate 5 that its end surface 12a rests on the inside surface 2a of the glazing 2. The projections 13 have such a height that their end surfaces 13a rest on the inside surface 3a of the insulation plate 3.

Hoses or solid pipes are connected to the supply ports 21 and the discharge ports 21A prior to a mounting of the glazing, said pipes being guided through the frame. As a result, outer pipe connections are formed, with which the solar collector can be connected into a pipeline system. It is also possible to directly create the connection to an adjacent collector through a piece of hose or a section of a pipe.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a solar collector for collecting the radiant heat energy of the sun and for transmitting this heat to a liquid heat carrier, comprising a pipeline system which has at least one supply port and one discharge port for conducting the heat carrier and a glazing which permits heat radiation to pass therethrough, which pipeline system is part of a platelike blow-molded absorber plate of plastic, in which adjacent pipes are formed by and separated from one another by thermoplastically welded mash seams of abutting plastic sheets, the improvement comprising a hollow frame which is made in one piece with the blow-molded absorber plate and forms the edge of the blow-molded absorber plate, said frame having a closed cross section, said hollow frame having on its upper side a fluted mortise for receiving the edge of said glazing.

2. The improved solar collector according to claim 1, wherein the depth of the fluted mortise is only slightly deeper than the thickness of the glazing.

3. The improved solar collector according to claim 1, including a heat-insulation layer on the back side of the plate, the frame having on its underside a fluted mortise for receiving the edge of the insulation layer therein, the fluted mortise being slightly deeper than the thickness of the insulation layer.

4. The improved solar collector according to claim 1, including an insulation layer below said plate, wherein support projections formed out of only one said sheet extend up to the inside surface of the glazing and support projections formed out of only the other said sheet extend down to the insulation layer.

5. The improved solar collector according to claim 1, including lugs formed at the corners of the frame and which comprise two material layers which are connected by mash welding and which lie in the same plane as the plate, and including fastening holes in said lugs.

6. The improves solar collector according to claim 8, wherein the pipe system includes a zigzag channel, at the one end of which at least said one supply port and at the other end of which at least one said discharge port is arranged.

7. The improved solar collector according to claim 1, including windows through the plate inboard of said hollow frame, wherein the supply port and the discharge port lie within said plate windows, and means defining guide ports extending through the width of the frame for guiding of supply and exhaust hoses from outside said frame into said plate window for connection to said supply and discharge ports.

8. The improved solar collector according to claim 1, wherein the blow-mold absorber plate consists of a black-colored polyprophylene.

9. The improved solar collector according to claim 1, wherein the cross-sectional height (h) of the frame is greater than its width (b).

10. A solar collector for collecting the radiant heat energy of the sun for transmitting this heat to a liquid heat carrier, comprising:

a blow-molded, non metal absorber plate formed by two opposed plastic sheets joined by welded mash seams laterally between which seams the sheets are transversely spaced to form a system of fluid flow passages, having an inlet port and an outlet port, in the central portion of said absorber plate, said opposed sheets also being transversely spaced apart along the peripheral portion of said absorber plate and thereby forming a hollow perimeter frame of closed cross section as an integral part of said absorber plate, said two opposed sheets as seen in cross section being separated near their common edge by the hollow of one part of said frame, then periodically by ones with said passages and finally by the hollow of the opposite part of said frame, said hollow frame being free of fluid connection to said passages, said two sheets being transversely spaced apart more at said frame hollows than at said passages, the sheet portions forming said frame including an inboard wall facing toward the central portion of said absorber and an outboard wall spaced therefrom by said hollow and facing away from said absorber plate central portion, said inboard wall being stepped without corresponding stepping of said outboard wall;

a glazing overlying the central portion of said absorber plate and permitting sunlight to pass therethrough toward said absorber plate, the edges of said glazing being received in the stepped portion of said inboard frame wall, said step being located to space the glazing above said central portion of said absorber plate, the space between said glazing and central portion of said absorber plate being laterally flanked by the hollow space within the frame portion of said absorber plate.

* * * * *

UNITED STATES PATENT OFFICE
CERTIFICATE OF CORRECTION

Patent No. 4 213 449      Dated July 22, 1980

Inventor(s) Manfred Roth and Jürgen Dreier

It is certified that error appears in the above-identified patent and that said Letters Patent are hereby corrected as shown below:

Col. 5, line 57; change "Claim 8" to ---Claim 7---.

Col. 6, line 10; change "window" to ---windows---.

Signed and Sealed this

Fourth Day of November 1980

[SEAL]

Attest:

SIDNEY A. DIAMOND

Attesting Officer      Commissioner of Patents and Trademarks

UNITED STATES PATENT OFFICE
CERTIFICATE OF CORRECTION

Patent No. 4 213 449        Dated July 22, 1980

Inventor(s) Manfred Roth and Jürgen Dreier

It is certified that error appears in the above-identified patent and that said Letters Patent are hereby corrected as shown below:

Col. 5, line 56; change "improves" to ---improved---.

Col. 5, line 56; change "Claim 8" to ---Claim 7---.

Col. 6, line 10; change "window" to ---windows---.

*Signed and Sealed this*

*Thirtieth* Day of *June 1981*

[SEAL]

*Attest:*

RENE D. TEGTMEYER

*Attesting Officer*     *Acting Commissioner of Patents and Trademarks*